Oct. 6, 1931.  M. J-B. BARBAROU  1,825,768
PROPELLER WITH VARIABLE PITCH
Filed March 1, 1930  2 Sheets-Sheet 1
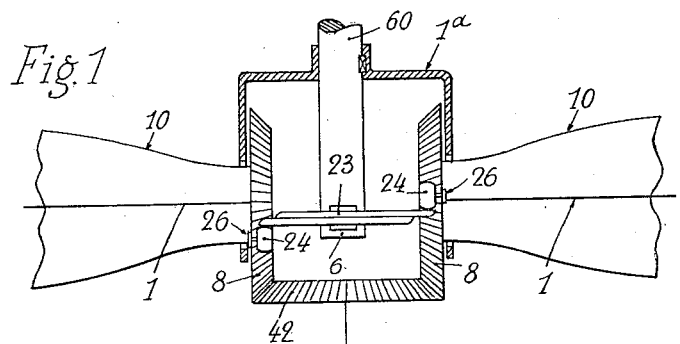
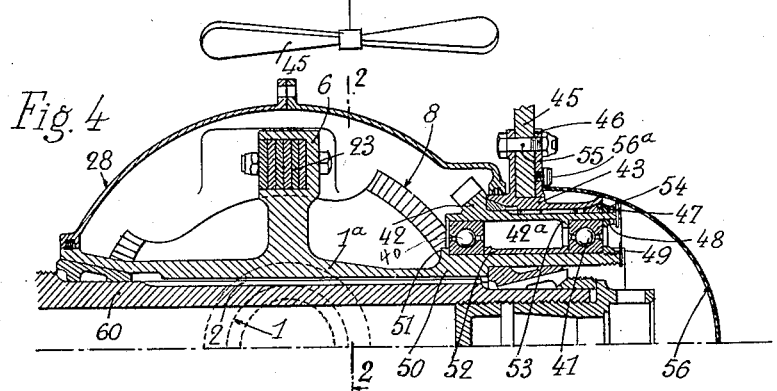
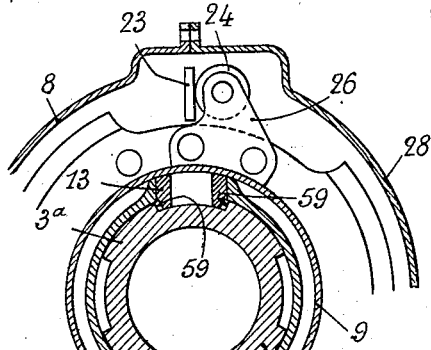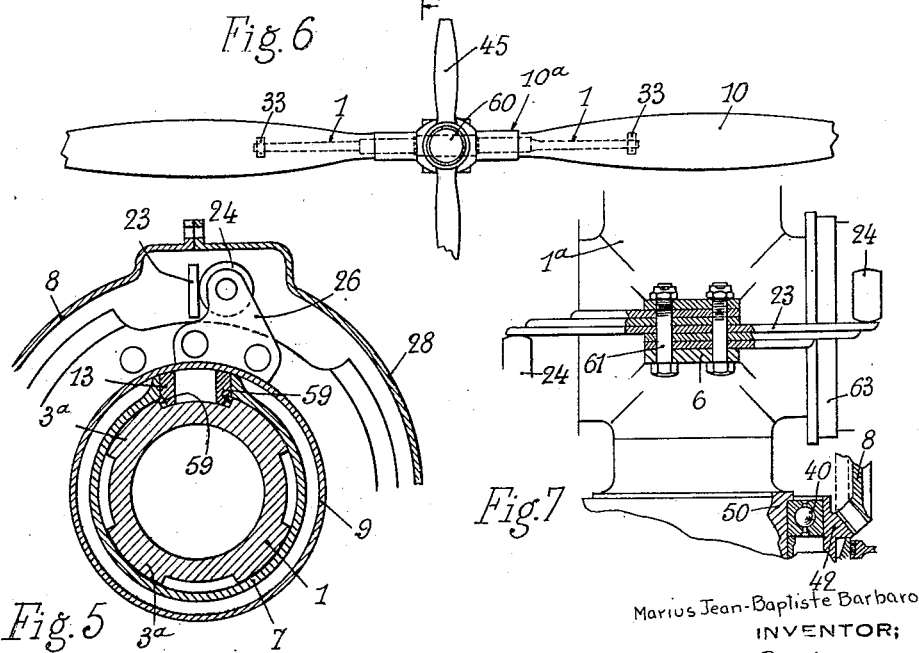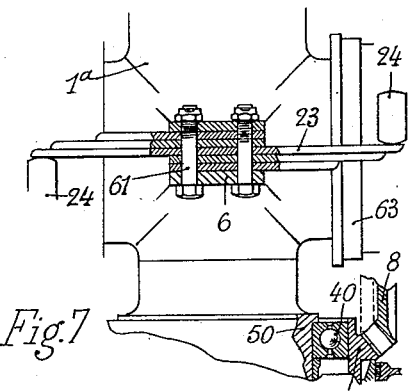
Marius Jean-Baptiste Barbarou
INVENTOR;
his Attorney

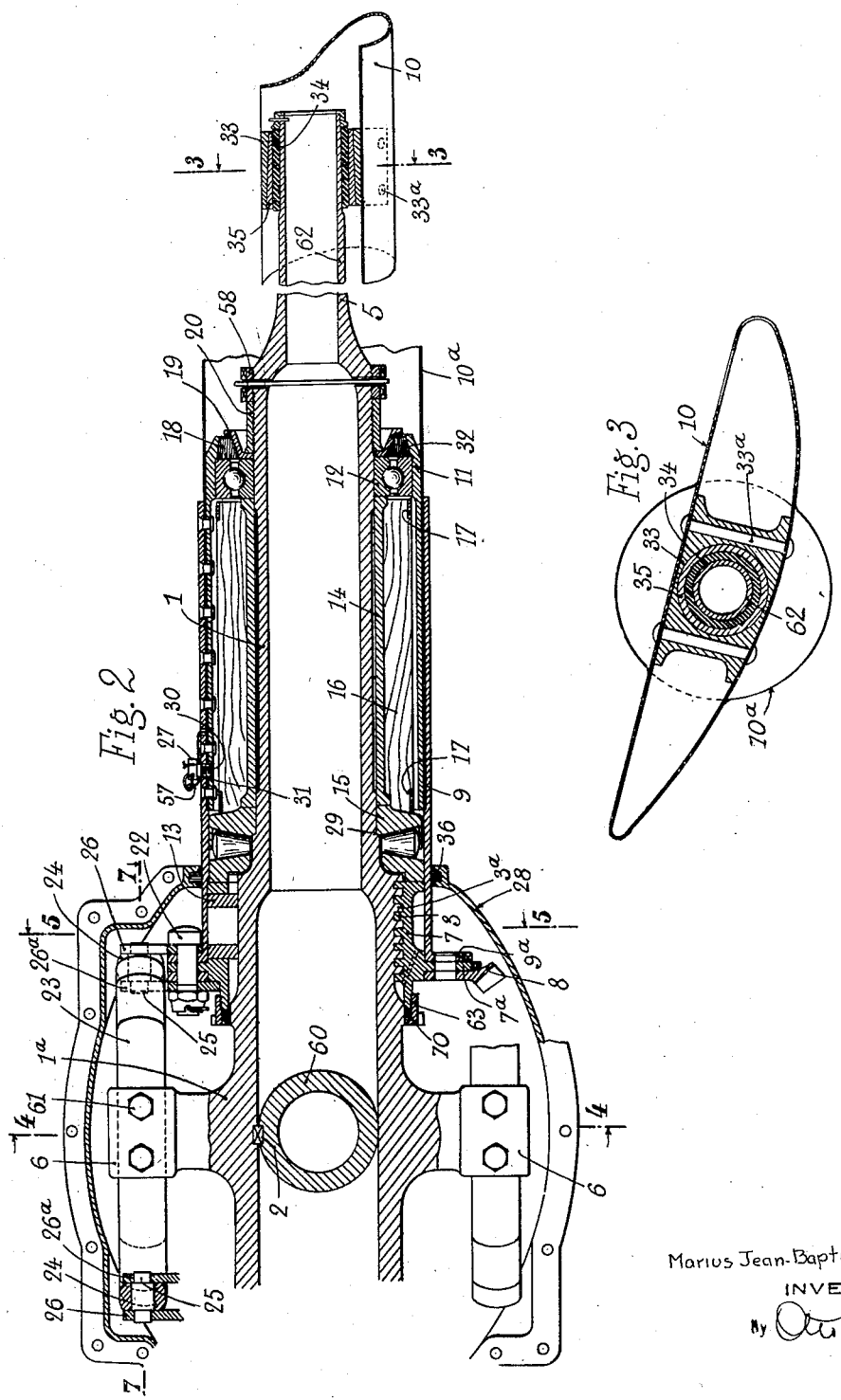

Patented Oct. 6, 1931

1,825,768

UNITED STATES PATENT OFFICE

MARIUS JEAN-BAPTISTE BARBAROU, OF PARIS, FRANCE

PROPELLER WITH VARIABLE PITCH

Application filed March 1, 1930, Serial No. 432,449, and in France March 19, 1929.

The present invention relates to propellers with variable pitch for aircraft, and it has for its object to provide a propeller unit in which the pitch of the propeller varies automatically with the altitude.

For this purpose, the invention comprises the combination of a main propeller provided with pivotal blades, with an auxiliary propeller having a constant pitch and actuated together with the main propeller by the driving shaft, the variable angular setting of the blades of the main propeller being automatically controlled by the relative movements between the two propellers due to the variation, according to the altitude, of the resisting torque produced by the air upon said auxiliary propeller.

According to a specific embodiment of the invention, the two propellers are connected together by a differential gearing whose casing is secured to the driving shaft, the parallel gear wheels being connected to the main propeller blades, and the intermediate pinion to said auxiliary propeller, said gear wheels being further connected together by an elastic means opposing a resistance to their rotation on their axes. Said elastic means may consist of springs bearing upon two rollers secured to the respective gear wheels.

Further characteristics of the invention will be specified in the following description, with reference to the accompanying drawings given by way of example, and in which:

Fig. 1 is a diagrammatic view of the propeller unit according to the invention.

Fig. 2 is a partial axial section of the main propeller of which only one blade is shown, the section being made on the line 2—2 of Fig. 4.

Fig. 3 is a cross section, on the line 3—3 of Fig. 2, of a main propeller blade.

Fig. 4 is a cross section, on the line 4—4 of Fig. 2.

Fig. 5 is a cross section on the line 5—5 of Fig. 2.

Fig. 6 is a front view on a smaller scale of the propeller unit.

Fig. 7 is a horizontal section on the line 7—7 of Fig. 2.

As shown in Fig. 1, 45 is an auxiliary propeller of constant pitch, secured to a bevel pinion 42, cooperating with two bevel pinions 8 secured to the blades 10 of the main propeller, said blades being rotatable about supporting arms 1; pinions 8 are held on a hub or casing 1ª keyed to the driving shaft 60. The torque of the propeller 45 is counter balanced by a spring 23, which presses with the proper force and in the proper direction upon two rollers 24, mounted upon supports 26, secured to the pinions 8. In normal speed conditions, said spring prevents the relative movement of pinion 42 and pinions 8. When the speed changes, for instance due to a change in the altitude, the resisting torque upon the constant-pitch propeller 45 is varied, and the springs 23 allows a certain relative motion between the pinions 42 and the pinions 8, which rotate the blades 10 of the variable-pitch propeller; the new inclination of the blades is such that the power absorbed will remain automatically constant.

In a preferred embodiment of the invention and as shown in Figs. 2 to 7, the arms of the main propeller, which are perpendicular to the driving shaft 60, are provided with a hub 1ª, having a transverse bore opening into an axial recess in arms 1 and adapted to fit upon said driving shaft 60 fastened therein by a key 2. Arm 1 carries at its centre a bracket 6 to which is secured a suitable laminated spring 23, by means of bolts 61. A cylindrical thrust member 7 (Figs. 2 and 5), provided with a packing ring 70 and a nut 63, is mounted on arm 1 by means of grooved sectors 3 which are formed only upon portions of said thrust member and engage corresponding grooved sectors 3ª of arm 1; the disposition is such that, in a given angular position, said thrust member may be slidden on arm 1 and, upon rotation of said member through a suitable angle, the grooved portions 3 and 3ª engage one another thus locking said thrust member 7 in the axial position. Said thrust member is provided with a shoulder 7ª. which serves to support on one side pinion 8, secured to said shoulder by any suitable means such as bolts 22, and on the other side a flanged part 9ª of a cylindrical sleeve 9. Bolts 22 are also adapted to hold upon said shoulder two plates 26 and 26ª, supporting the pivot pins 25 of rollers 24, plate 26 being centered on sleeve 9 and plate 26ª upon thrust member 7. Rollers 24 are caused to bear in the proper direction upon the ends of spring 23. Thrust member 7 is recessed (Fig. 5) for the insertion of a sleeve-shaped stop member 13, located between the grooves of arm 1, thus limiting the displacements of pinion 8 by its contact with shoulders 59, formed on arm 1, a certain play being provided. A casing 28 encloses the several parts, and leakage of oil is prevented by a stuffing-box 36.

Between sleeve 9 and an inner tube 11, which is mounted on a ball bearing 12 disposed on arm 1, is riveted the central cylindrical part 10ª of the corresponding blade 10 of the variable-pitch propeller, which blade may consist of a hollow sheet metal member (Fig. 3). A spacing member 14 is interposed between the ball bearing 12 and a thrust bearing 15, comprising tapered rollers, cooperating with the thrust member 7. A disk 32 in contact with said ball bearing 12, supports a packing member 18 which is held by a ring 19, pressed by a nut 20 cooperating with a lock nut 58 and a pin 21. A wooden tube 16, hooped at each end at 17 surrounds member 14 and restricts the space offered to the lubricating oil, which is supplied through an oiler 30 closed by a screw plug 27, provided with a packing ring 31. Plug 37 is locked in place by a braking or locking member 57.

Arm 1 is extended beyond lock nut 58 by a reduced portion 62 whose end extends through a bearing 33, riveted to the inner wall of the blade 10 at 33ª. The connection between arm 1 and bearing 33 is made elastic by an india rubber ring 34, held in compressed condition by a ring 35 having a tapered fit in bearing 33.

The auxiliary propeller is mounted in the following manner. A portion 50 of the hub 1ª forms a support for two ball bearings 40—41. On said support is a shoulder 51 engaging ball bearing 40; a spacing member 52 is interposed between said bearing and ball bearing 41, which is held by a pinned nut 49. A toothed ring 42 is mounted on and centered by said ball bearings 40—41, and is held by a shoulder 53 and an inner nut 48; it is formed with flutes 42ª cooperating with flutes of the hub 43 of said constant-pitch propeller 45 for driving the latter. Said propeller is secured to the hub 43 by a plate 46 and bolts 55. Lateral motion of said hub is prevented by a tapered ring 54, secured by a nut 47. A cover 56 is secured to plate 46 by screws 56ª.

The operation is as follows: At a given altitude, for instance on the ground, when the propeller 10 rotates at normal speed it drives the constant-pitch propeller 45, and the springs 23 will exactly balance the torque which is produced by the rotation of propeller 45 and is imparted to said springs by pinions 42 and 8. The blades of the propeller 10 have a fixed position with reference to arms 1. At a higher altitude, the air pressure is smaller, and the resisting torque provided by the rotation of the constant-pitch propeller 45 will be reduced; the springs 23 now prevail over this torque and thus impart a certain relative rotation to the pinions 42 and 8, which rotation is limited by the shoulders 59 (Fig. 5); the direction of the blades 10 is thus changed, that is, the pitch of the propeller is now modified, and notwithstanding the tendency of said propeller to race on account of the reduced air pressure, it will preserve its normal speed, due to the increased pitch and torque.

The action is reversed when the air pressure increases, as during the descent of the machine. This affords at each altitude an automatic variation of the pitch of the main propeller, and its speed will thus be substantially constant.

The elastic connection 33—34—35 prevents the deformation of the blades, and it tends to reduce the vibrations of said blades when rotating. The stop 15 and the grooves 3 of the thrust member support all centrifugal stress exercised upon the blades 10.

Obviously, the invention is not limited to the constructional form herein described and represented, which is given solely by way of example.

Having now described my invention what I claim as new and desire to secure by Letters Patent is:

1. A propeller unit comprising in combination a propeller shaft, a main propeller frame keyed to said shaft, propeller blades pivotally mounted on said frame, an auxiliary propeller of constant pitch transmission, means for operatively connecting said auxiliary propeller with said propeller blades whereby rotation of said auxiliary propeller relatively to said frame causes pivotation of said blades relatively to said frame, said transmission means having a constant motion transmitting ratio and yielding means for resiliently opposing said relative movements.

2. A propeller unit comprising in combination a propeller shaft, a main propeller frame keyed to said shaft, propeller blades pivotally mounted on said frame, an auxiliary propeller, a differential gear comprising a casing rigid with said frame, sun wheels rigid with said blades and a planetary pinion rigid with said auxiliary propeller, a spring attached to said frame and rollers carried by said sun wheels and engaging said spring.

3. In a propeller unit as claimed in claim 1, stop means for limiting said relative movements.

4. A propeller unit as claimed in claim 1, comprising a stop member between each blade and said frame, said stop member being connected with one of said parts and movable between shoulders of the other part.

5. A propeller unit comprising a propeller with pivotal blades, a resisting torque-influenced member, means for operatively connecting said member with the blades of said propeller, whereby a displacement of said member due to a resisting torque variation causes pivotation of said blades in said propeller, and yielding means for resiliently opposing said pivotation.

In testimony whereof I have signed my name to this specification.

MARIUS JEAN-BAPTISTE BARBAROU.